United States Patent [19]

Etherington

[11] Patent Number: 5,844,504
[45] Date of Patent: Dec. 1, 1998

[54] COMPRESSED CIRCLE FLIGHT DISPLAY

[75] Inventor: Tim Etherington, Cedar Rapids, Iowa

[73] Assignee: Rockwell International, Costa Mesa, Calif.

[21] Appl. No.: 898,660

[22] Filed: Jul. 22, 1997

[51] Int. Cl.⁶ .................................................. G01C 23/00
[52] U.S. Cl. ......................... 340/973; 340/977; 340/978
[58] Field of Search ................................ 340/973, 974, 340/975, 977, 978, 979, 980, 461

[56] References Cited

U.S. PATENT DOCUMENTS

| | | | |
|---|---|---|---|
| D. 257,832 | 1/1981 | Flint et al. ................................ | D10/67 |
| 4,419,832 | 12/1983 | Schmidt .................................... | 33/329 |
| 4,573,925 | 3/1986 | Styers ....................................... | 434/49 |
| 4,811,003 | 3/1989 | Strathman et al. . | |
| 4,860,007 | 8/1989 | Konicke et al. ......................... | 340/973 |
| 4,913,383 | 4/1990 | Hill et al. ................................ | 248/27.1 |
| 5,136,301 | 8/1992 | Bechtold et al. ........................ | 342/176 |
| 5,231,379 | 7/1993 | Wood et al. ............................. | 340/980 |
| 5,250,947 | 10/1993 | Worden et al. ......................... | 340/975 |
| 5,258,756 | 11/1993 | Bauer et al. ............................. | 340/971 |
| 5,359,890 | 11/1994 | Fulton et al. ............................ | 340/973 |
| 5,412,382 | 5/1995 | Leard et al. ............................. | 340/974 |

*Primary Examiner*—Brent A. Swarthout
*Attorney, Agent, or Firm*—Kyle Eppele; James P. O'Shaughnessy

[57] ABSTRACT

An altimeter is disclosed which includes an arcuate top portion and an arcuate bottom portion. Side portions connect the arcuate top portion to the arcuate bottom portion. The side portions have a curvature less than a curvature of the top portion or the bottom portion, thus giving the altimeter a narrower footprint while preserving important features of conventional dial-type altimeters. An indicator moves about the perimeter of the altimeter based on altitude information, thus displaying altitude of the aircraft.

18 Claims, 5 Drawing Sheets

5,844,504

COMPRESSED CIRCLE FLIGHT DISPLAY

FIELD OF THE INVENTION

The present invention relates generally to Primary Flight Displays (PFD's), and more particularly relates to dial-like flight instruments where rate information is an important element of efficient display, such as an altimeter and an airspeed indicator.

BACKGROUND OF THE INVENTION

In the past, avionics display engineers have attempted to enhance the display of information to pilots and still retain many of the basic configurations and appearances of earlier displays. Much effort has been expended in this pursuit. However, frequently the "improvements", which are designed to enhance the pilot's efficiencies, are less attractive than the displays which they are purported to improve.

For example, vertically oriented linear altimeters and airspeed indicators provide the advantage of a small gauge footprint, but have met with a mixed reception in the industry. Although dial-type gauges are often preferable to some pilots, they have a larger gauge footprint or profile than vertically orientated linear gauges and have therefore met with some disfavor in the industry because aircraft cockpits are becoming more crowded as pilots are provided with additional flight information.

Consequently, there exists a need for further improvement in flight displays in order to provide enhanced, intuitive readability, while abiding within increasingly smaller cockpit space constraints.

SUMMARY OF THE INVENTION

An altimeter includes an arcuate top portion and an arcuate bottom portion. Side portions connect the arcuate top portion to the arcuate bottom portion. The side portions have a curvature less than the curvature of the top portion or the bottom portion. An indicator moves about the perimeter of the altimeter based on altitude information, thus displaying altitude of the aircraft.

An airspeed indicator includes an arcuate top portion and an arcuate bottom portion. Side portions connect the arcuate top portion to the arcuate bottom portion. The side portions have a curvature less than the curvature of the top portion or the bottom portion. An indicator moves about the perimeter of the airspeed indicator based on airspeed information, thus displaying airspeed of the aircraft.

DETAILED DESCRIPTION OF THE PREFERRED EMBODIMENTS

Figure 1:
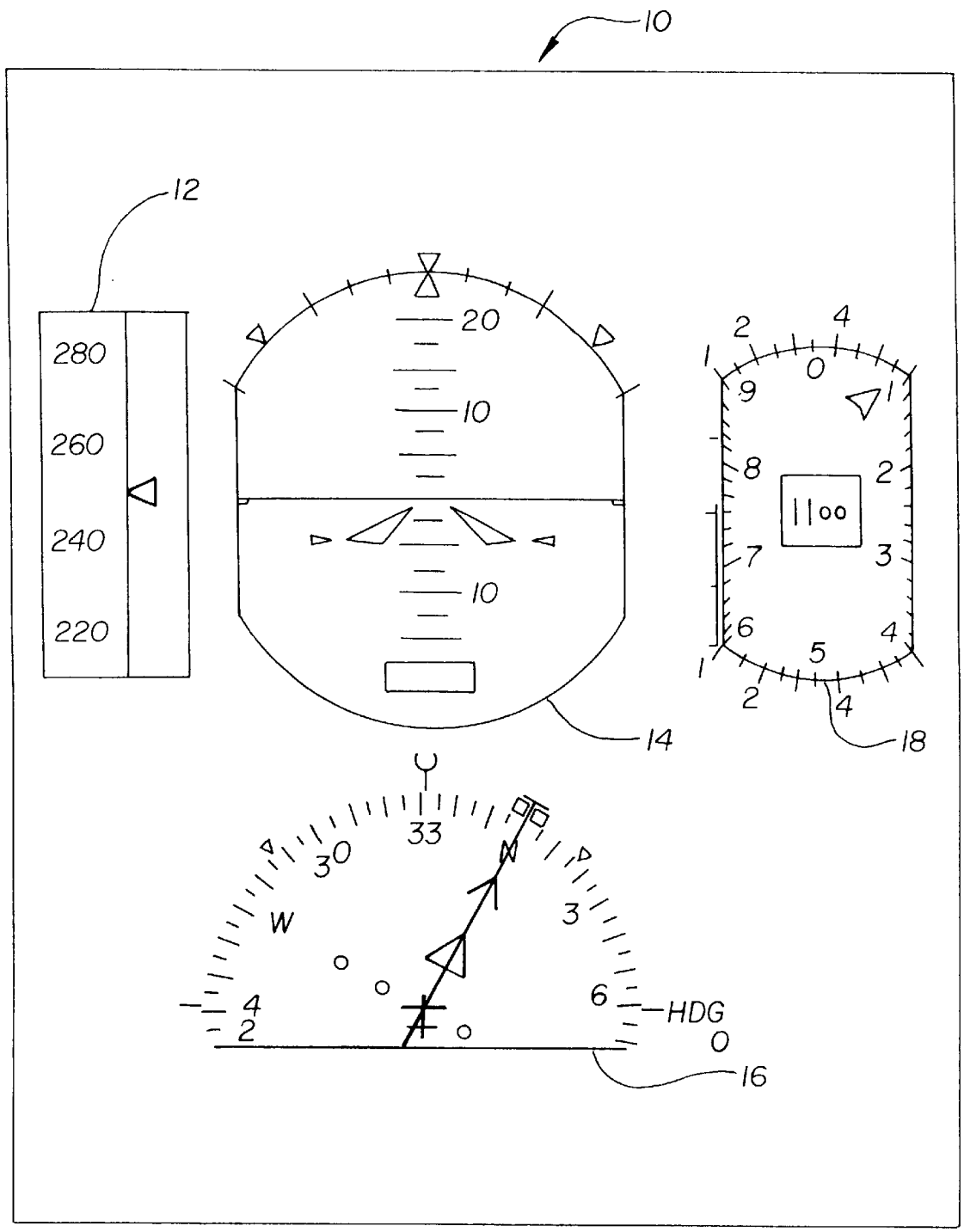
FIG. 1 is an elevation view of a primary flight display in accordance with the present invention.

FIG. 1 is an elevation view of Primary Flight Display (PFD) 10 embodying features of the present invention. Preferably, PFD 10 includes airspeed indicator 12, attitude indicator 14, heading indicator 16 and altimeter 18. Those skilled in the art will recognize that PFD 10 preserves the classic T-shaped configuration to which pilots have grown accustomed. It should also be noted that although the four gauges are mentioned independently, the present invention could be practiced by creating PFD 10 on an appropriate display such as an LCD, or CRT display.

Air speed indicator 12 is shown in FIG. 1 having a vertically orientated linear scale and the classic rectangular footprint which is common to such gauges. Although such configuration of airspeed indicator 12 is preferred, airspeed indicator 12 may also embody features of the present invention, as will be described with respect to FIG. 4.

Attitude indicator 14 may be any appropriate attitude indicator which provides a substitute horizon which a pilot may use for reference when the true horizon is obscured by weather or darkness or when the pilot is flying under instrument flight rules (IFR).

Heading indicator 16 is preferably a conventional heading indicator which provides an indication to the pilot of a direction in which the aircraft is heading. Typically, such an indicator resembles the face of a compass.

Altimeter 18 embodies features of the present invention, including a rounded top and bottom and straight or straighter sides. Altimeter 18 provides a pilot with an indication of the height of the aircraft over sea or ground.

Figure 2B:
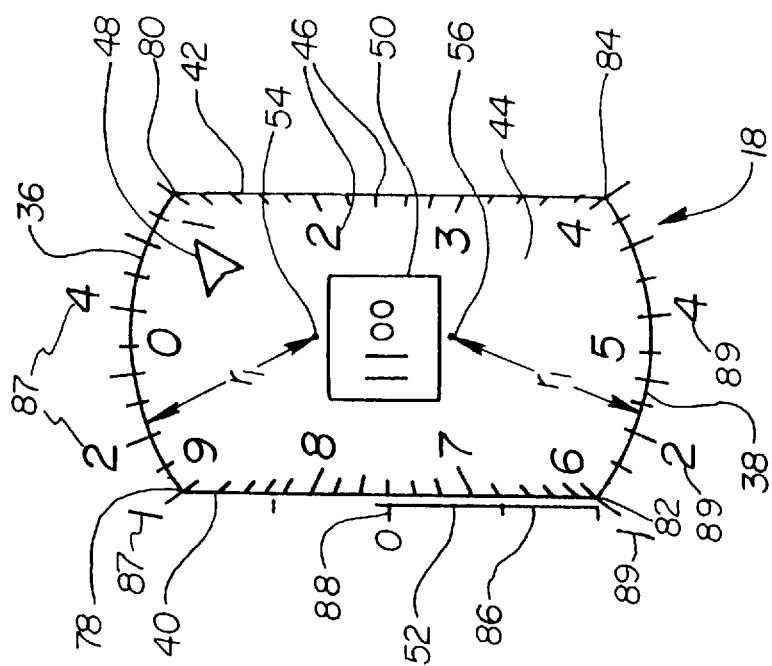
FIG. 2b is an elevation view of an aircraft altimeter in accordance with the present invention.
Figure 2A:
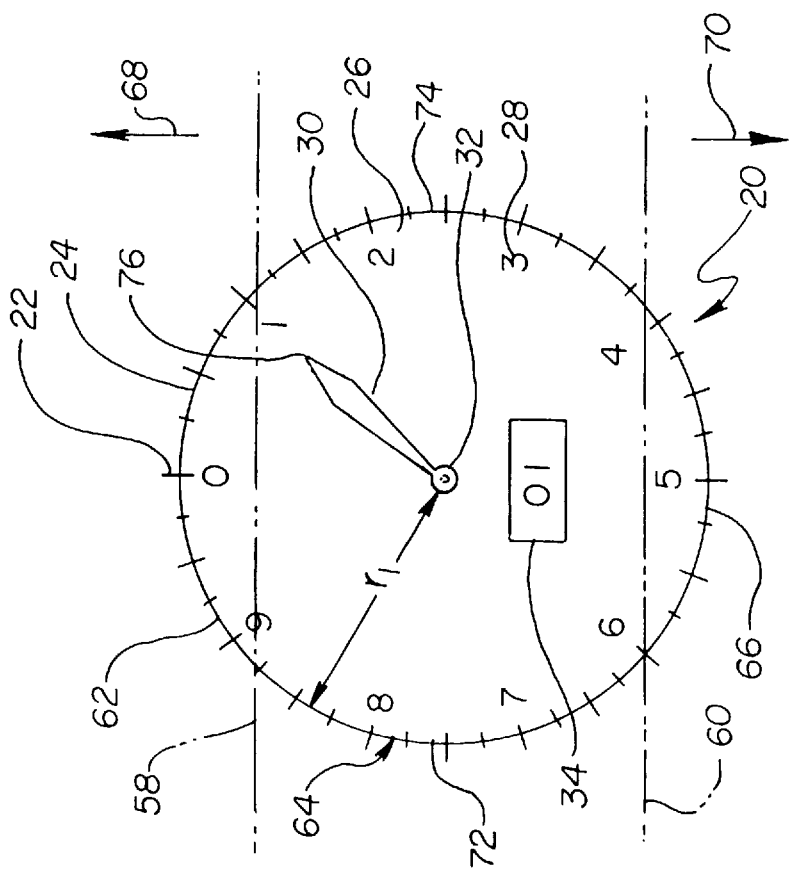
FIG. 2a is an elevation view of an aircraft altimeter of the prior art.

FIGS. 2a and 2b are elevation views of aircraft altimeters 20 and 18 respectively. FIG. 2a is an elevation view of aircraft altimeter 20 of the prior art. FIG. 2b is an elevation view of an aircraft altimeter 18 in accordance with present invention.

Conventional altimeter 20 is of circular shape, with altitude indicating tick marks 22 spaced equally about gauge perimeter 24. Conventional gauge 20 has a gauge face 26 with altitude indicating indicia 28 disposed thereon. A needle 30 extends from center 32 of circular dial face 26 to a location proximate gauge perimeter 24 and rotates about center 32 based upon altitude information. Additionally, conventional altimeter 20 typically includes a rolling drum readout 34 which displays the number of thousands of feet of altitude, as will be recognized by those skilled in the art. Thus, for every full rotation of needle 30 about center 32, the readout of rolling drum 34 will change by one. For example, conventional gauge 20 is shown displaying an altitude of 1,100 feet (1×1000+100).

FIG. 2b is an elevation view of altimeter 18 in accordance with the present invention. Altimeter 18 includes top portion 36, bottom portion 38, first side 40, second side 42, gauge face 44, altitude indicia 46, and indicator 48. Preferably, altimeter 18 also includes readout 50 and vertical speed indicator 52.

Top portion 36, and bottom portion 38, are curved with preferably the same curvature. Top portion 36 and bottom portion 38 are opposedly spaced apart with top portion 36 having center of curvature 54 and bottom portion 38 having center of curvature 56. For comparison purposes, the radius from center of curvature 54 to top portion 36 and the radius from center of curvature 56 to bottom portion 38 are shown equal to radius $r_1$ of conventional gauge 20.

Arcuate top portion 36 also includes first end 78 and second end 80. Additionally, bottom arcuate portion 38 includes first end 82 and second end 84. First side 40 extends from first end 78 of top arcuate portion 36 to first end 82 of bottom arcuate portion 38. Additionally, second side 42 extends from second end 80 of top arcuate portion 36 to second end 84 of bottom arcuate portion 38 forming gauge face 44 therein. Altitude indicating indicia 46 is preferably spaced regularly about the periphery of gauge face 44.

Altimeter 18 also preferably includes rolling drum display 50 which indicates altitude numerically in a conventional rolling drum format. However, those skilled in the art will recognize that numerical display 50 differs from conventional rolling drum indicators in that the digit in the hundreds position is indicated larger than the digits in the tens and ones positions. Typically, in the prior art only the ten thousands and thousands digits are indicated larger than the other digits. One of the features of altimeter 18 of the present invention is that altitude indication modes are selectable between a low altitude indication mode in which numerical indicator 50 indicates altitude precisely as a conventional rolling drum readout, and a high altitude mode in which the hundredths digit of numerical indicator 50 is displayed larger than tens and ones digits.

FIG. 2b also shows vertical speed indicator 52 disposed proximate the outer periphery of altimeter 18. Vertical speed is depicted by vertical speed indicator 52 as a bar 86 which moves about the outer periphery of altimeter 18 based upon rate of altitude change. When such rate is zero, bar 86 is centered upon vertical speed zero mark 88. If vertical speed increases from such flat flight, bar 86 moves upwardly along first side 40 until bar 86 encounters first end 78 of top portion 36. Upon a further increase of vertical speed, bar 86 bends around first end 78 such that bar 86 continues to follow the outer periphery of gauge 18. Negative vertical speed is indicated in the same manner except with downward motion. Top vertical speed scale portion 87 and bottom vertical speed scale portion 89 (corresponding to top and bottom portions 36 and 38, respectively) are not normally in view during operation in order to provide a simpler, less cluttered display. However, when vertical speed exceeds +/−1,000 fpm, the appropriate scale is displayed to provide a numerical quantity and a cue of increasing/decreasing vertical speed.

Referring back to FIG. 2a, phantom lines 58 and 60 are shown intersecting conventional gauge 20 such that a top portion 62, middle portion 64, and bottom portion 66 are formed. For comparison purposes, in some preferred embodiments, the length of arcuate segment 62 is shown equal to the length of top portion 36 of gauge 18 of the present invention. Likewise, the length of arcuate segment 64 of conventional gauge 20 is shown equal to the length of arcuate bottom portion 38 of gauge 18 of the present invention. As can be seen, if arcuate top segment 62 is moved in a direction indicated by arrow 68, while bottom arcuate segment 66 is simultaneously moved in a direction indicated by arrow 70 while both segments are connected to middle portion 64, conventional gauge 20 will resemble altimeter 18 of the present invention. Thus, two centers are created spaced apart from center 32.

Referring back to FIG. 2b, it can be seen that, for comparison purposes, the lengths of first side 40 and second side 42 are equal to the lengths of first side 72 and second side 74, respectively, of conventional gauge 20. Thus, the perimeter of altimeter 18 preferably is equal to the circumference of conventional gauge 20. This is an important feature of the present invention because although altimeter 18 has a smaller width or footprint than conventional gauge 20, the movement of indicator 48 closely parallels the movement of needle 30 of conventional gauge 20 such that pilot acceptance is thereby enhanced. More specifically, for a given rate of altitude change, indicator 48 will preferably move with respect to the perimeter of gauge 18 with exactly the same speed as the tip 76 of needle 30 of conventional gauge 20 moves with respect to perimeter 24 of gauge 20. The speed of indicator 48 along sides 40 and 42 is also equal to the speed of indicator 48 along top portion 36 and bottom portion 38, thereby not introducing any artificial speed cues.

Figure 3:
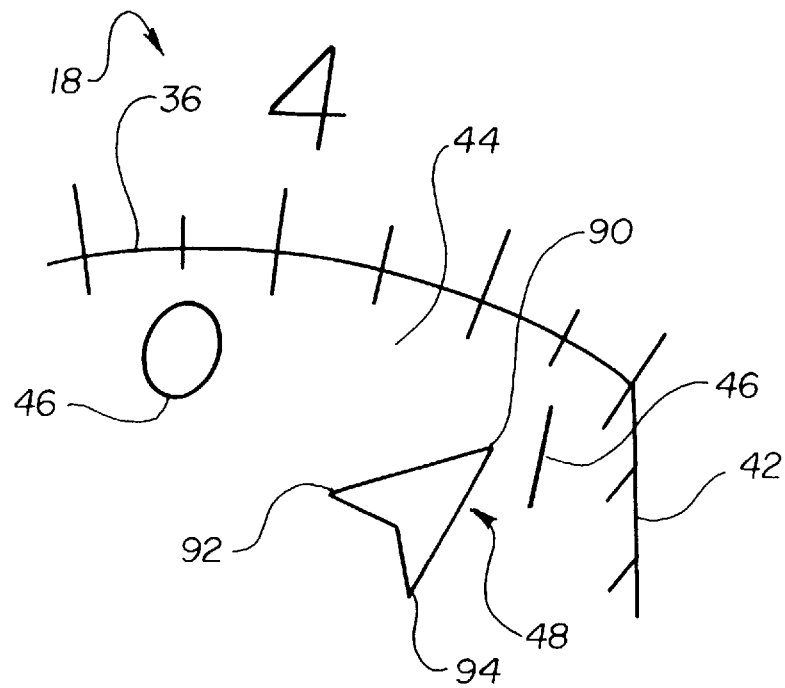
FIG. 3 is an elevation view of a section of an altimeter in accordance with the present invention.

FIG. 3 is an elevation view of a portion of altimeter 18 in accordance with the present invention. FIG. 3 shows part of top portion 36, and second side 42. Further, FIG. 3 also shows altitude indicating indicia 46. As described above, altitude indicator 48 preferably moves within gauge face 44 proximate the periphery of altimeter 18, which includes top and bottom portions 36 and 38 and sides 40 and 42. In the preferred embodiment, indicator 48 is triangular having a pointing tip 90. As indicator 48 moves about the periphery of altimeter 18, tip 90 moves at a constant linear rate and indicator 48 rotates at a constant rate about tip 90 so that when indicator 48 traverses the periphery of altimeter 18, indicator 48 will have rotated through one full revolution. This motion closely mimics altimeter 20 especially due to the motion of tip 90 which the pilot's eyes follow during the instrument scan.

Figure 4:
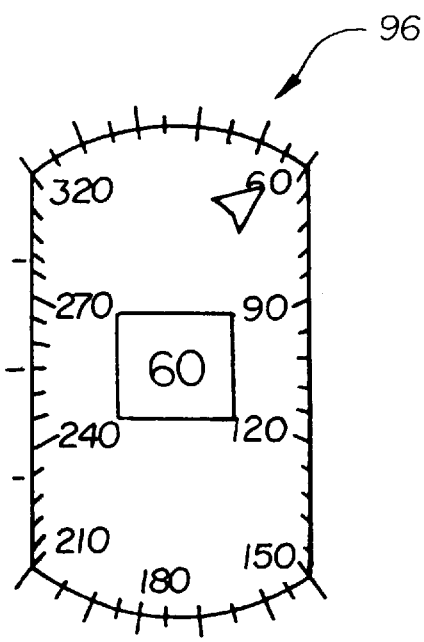
FIG. 4 is an elevation view of an airspeed indicator in accordance with the present invention.

FIG. 4 is an elevation view of an airspeed indicator 96 in accordance with the present invention. Airspeed indicator 96 indicates aircraft airspeed (in knots) precisely in the manner described with respect to the indication of altitude by altimeter 18. Therefore, airspeed indicator 96 is not discussed separately in great detail. However, it will be understood that the discussions of the features of the altimeter of the present invention, including discussions of the first and second curved ends joined by two straight or straighter sides to produce a smaller footprint, apply to indicator 96 as well.

Figure 5:
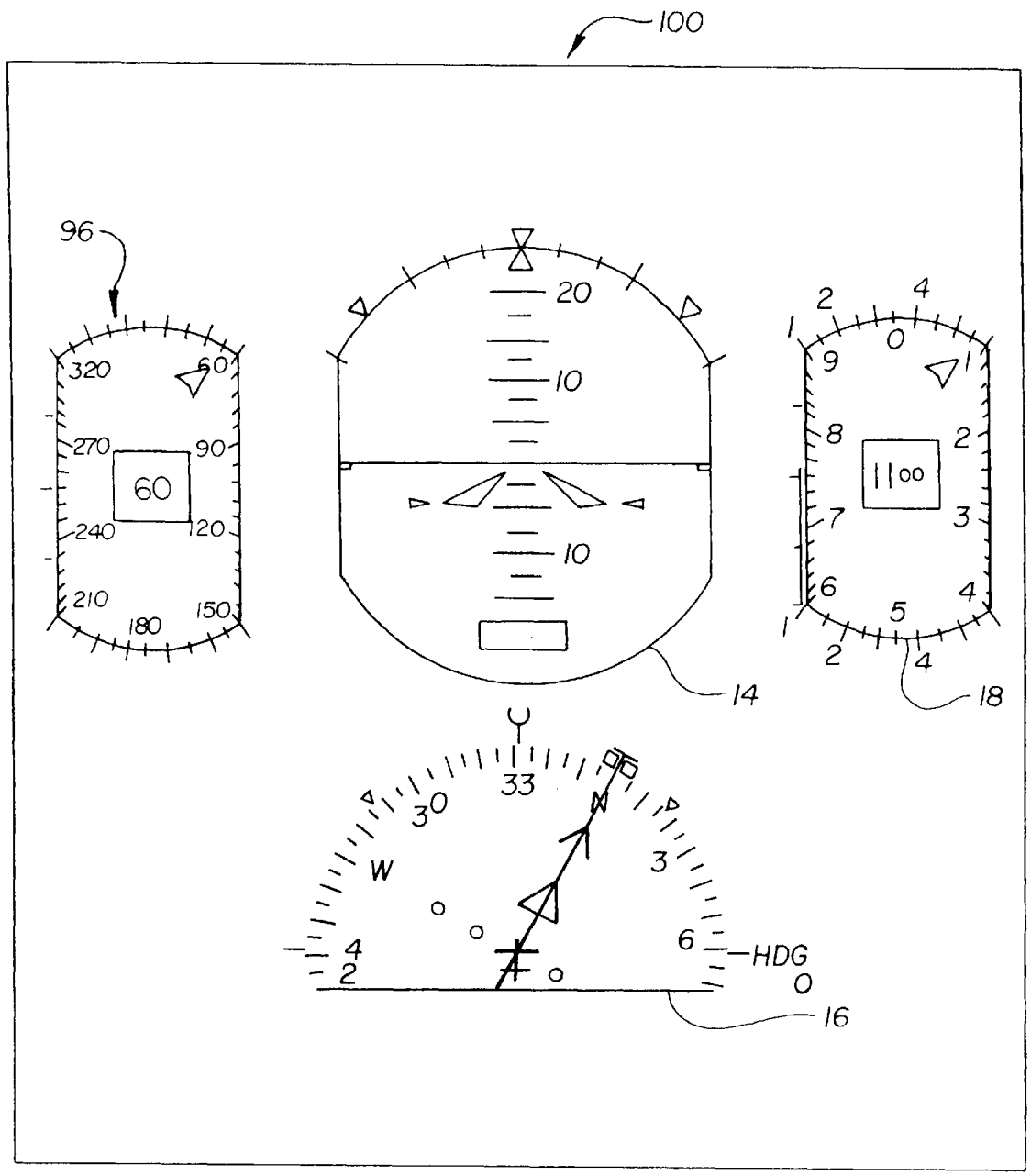
FIG. 5 is an elevation view of a primary flight display in accordance with the present invention.

FIG. 5 is an elevation view of PFD 100 embodying additional features of the present invention. More specifically, PFD 100 differs from PFD 10 by employing airspeed indicator 96 of the present invention instead of conventional airspeed indicator 12 as described with respect to FIG. 1. As can be seen, by substituting airspeed indicator 96 for airspeed indicator 12, substantial symmetry is achieved which is believed to be more aesthetically pleasing to pilots, such that the pilots acceptance will be enhanced.

Figure 6:
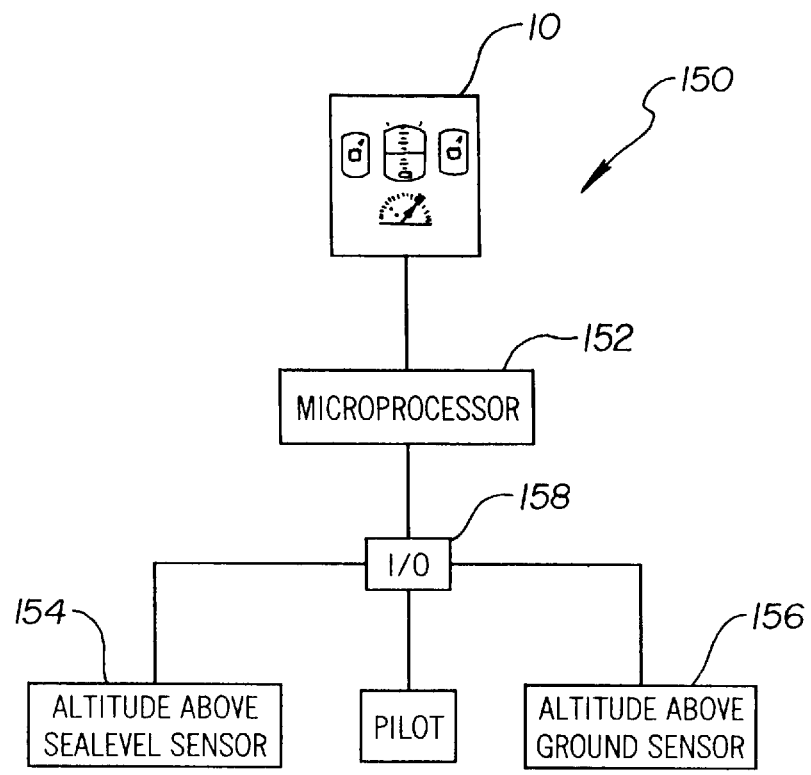
FIG. 6 is a block diagram of a primary flight display system in accordance with the present invention.

Now referring to FIG. 6, there is shown a primary flight display system, of the present invention, generally designated 150 which includes PFD 100. PFD 100 is preferably a CRT or LCD. Coupled with PFD 100 is microprocessor 152 which receives input from altitude above sea level sensor 154 and altitude above ground sensor 156, by way of input/output (I/O) device 158. Microprocessor 152 outputs a signal to control display PFD 100. Altitude above sea level sensor 154 may be a barometric altitude sensor which is well known in the art, a GPS receiver or any other suitable device for measuring the altitude above sea level. Altitude above ground level sensor 156 may be a radio altimeter which is well known in the art, or any other suitable device for measuring the altitude above ground. I/O device 158 is coupled to microprocessor 152 for providing information from the altitude sensors 154 and 156 and the pilot and crew to the microprocessor 152 which is necessary for the overall operation of system 150. Of course, in system 150, PFD 100 can be replaced with PFD 10 if desired.

Thus, an aircraft altimeter and an airspeed indicator are provided which offer the readability of conventional dial-type aircraft gauges, while providing small footprint advantages of traditional vertically orientated scroll type liner gauges. Further, because most flights are conducted at cardinal altitudes or cardinal altitudes plus 500 feet, most of the time the altimeter behaves exactly like a conventional altimeter. In addition, a built in +/−100 foot cue from these altitudes is part of the basic configuration.

Although the present invention has been described with reference to preferred embodiments, workers skilled in the art will recognize that changes may be made in form and detail without departing from the spirit and scope of the invention. For example, any appropriate implementation of the present invention may be used, including, but not limited to, mechanical gauges, or electrical gauges embodied in an LCD or CRT display.

What is claimed is:

1. An aircraft altimeter for indicating an altitude the altimeter comprising:

an arcuate top portion having a first curvature, a first end and second end;

an arcuate bottom portion having the first curvature, a first end, and a second end, and being oppposedly spaced apart from the top portion;

a first lateral edge having a second curvature less than the first curvature and extending from the first end of the top portion to the first end of the bottom portion;

a second lateral edge having a third curvature less than the first curvature, and extending from the second end of the top portion to the second end of the bottom portion forming a display area therein;

altitude indicia disposed at equal linear distances proximate a perimeter of the display area;

an indicator indicating the altitude indicia based upon the altitude and traversing the altitude indicia at a constant rate for a given altitude rate of change; and wherein the perimeter is substantially equal to a circumference of a circle having the first curvature.

2. The aircraft altimeter of claim 1 wherein the first and second lateral edges are straight.

3. The aircraft altimeter of claim 1 wherein the indicator has a triangular shape with an indicating corner indicating the altitude indicia.

4. The aircraft altimeter of claim 3 wherein the indicator moves about the perimeter and rotates about the indicating corner based upon the altitude.

5. The aircraft altimeter of claim 1 and further comprising a numerical rolling drum indicator displaying a numerical value based upon the altitude.

6. The aircraft altimeter of claim 5 wherein the rolling drum indicator comprises a hundredths digit, and tens digit, and wherein the hundredths digit is larger than the tens digit.

7. The aircraft altimeter of claim 1 and further comprising a vertical speed indicator disposed proximate the perimeter of the display area and indicating vertical speed based upon a rate of change of the altitude.

8. An aircraft airspeed indicator for indicating an airspeed, the airspeed indicator comprising:

a arcuate top portion having a first curvature, a first end, and a second end;

an arcuate bottom portion having the first curvature, a first end, and a second end, and being oppposedly spaced apart from the top portion;

a first lateral edge having a second curvature less than the first curvature, and extending from the first end of the top portion to the first end of the bottom portion;

a second lateral edge having a third curvature less than the first curvature, and extending from the second end of the top portion to the second end of the bottom portion forming a display area therein;

airspeed indicia disposed at equal linear distances proximate a perimeter of the display area;

an indicator indicating the airspeed indicia based upon the airspeed and traversing the airspeed indicia at a constant rate for a given airspeed rate of change; and wherein the perimeter is substantially equal to a circumference of a circle having the first curvature.

9. The aircraft airspeed indicator of claim 8 wherein the first and second edges are straight.

10. The aircraft airspeed indicator of claim 8 wherein the indicator has a triangular shape with an indicating corner indicating the airspeed indicia.

11. The aircraft airspeed indicator of claim 10 wherein the indicator moves about the perimeter and rotates about the indicating corner based upon the airspeed.

12. The aircraft airspeed indicator of claim 8 and further comprising a numerical rolling drum indicator displaying a numerical value based upon the airspeed.

13. A primary flight display comprising:

an airspeed indicator;

an attitude indicator;

a heading indicator; and an altimeter comprising:

an arcuate top portion having a first curvature, a first end and a second end;

an arcuate bottom portion having the first curvature, a first end and a second end, and being oppposedly spaced apart from the top portion;

a first straight edge connecting the first end of the top portion to the first end of the bottom portion;

a second straight edge connecting the second end of the top portion to the second end of the bottom portion forming an altimeter display area between the top and bottom portions and between the first and second edges, wherein a perimeter of the altimeter display area is equal to a circumference of a circle having the first curvature further wherein altitude indicia are equally linearly spaced proximate the perimeter of the altimeter wherein an indicator traverses the altitude indicia at a constant rate for a given altitude rate of change.

14. The primary flight display of claim 13 wherein the airspeed indicator comprises:

an arcuate top portion having a second curvature, a first end and a second end;

an arcuate bottom portion having the second curvature, a first end and a second end, and being oppposedly spaced apart from the top portion;

a first straight edge extending from the first end of the top portion to the first end of the bottom portion;

a second straight edge extending from the second end of the top portion to the second end of the bottom portion forming an airspeed indicator display area between the top and bottom portions and between the first and second edges, wherein a perimeter of the airspeed indicator display area is equal to a circumference of a circle having the second curvature.

15. The primary flight display of claim 14 wherein the airspeed indicator and altimeter are disposed on opposite sides of the attitude indicator.

16. The primary flight display of claim 14 and further comprising a numerical rolling drum display disposed in a central portion of the airspeed indicator display area for numerically indicating airspeed based upon the airspeed.

17. The primary flight display of claim 13 and further comprising a vertical speed indicator disposed proximate the perimeter of the altimeter displaying a vertical speed based on a rate of change of the altitude.

18. The primary flight display of claim 13 and further comprising a numerical rolling drum display disposed in a central portion of the display area indicating the altitude, numerically, based upon the altitude.

* * * * *